R. N. CHAMBERLAIN.
SEPARATOR FOR STORAGE BATTERIES.
APPLICATION FILED OCT. 21, 1918.
1,343,708.
Patented June 15, 1920.
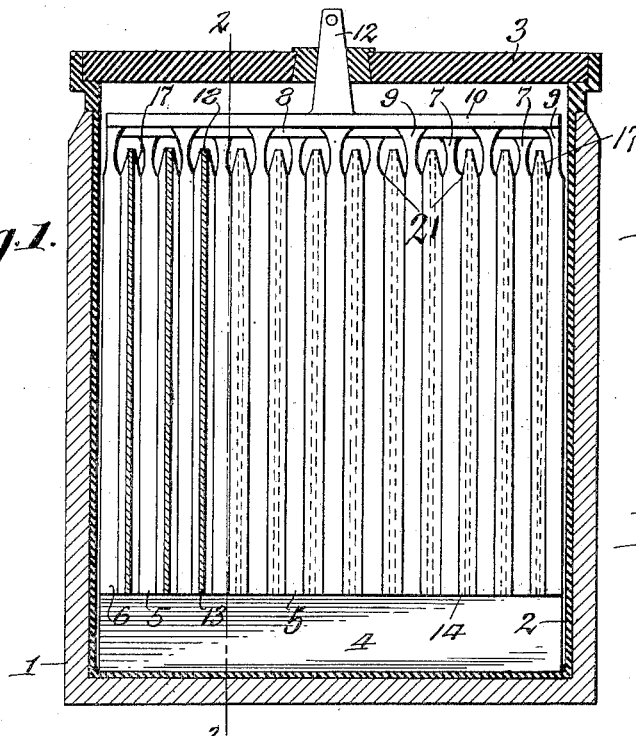
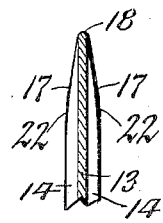
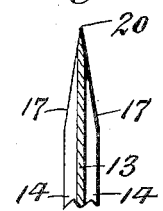
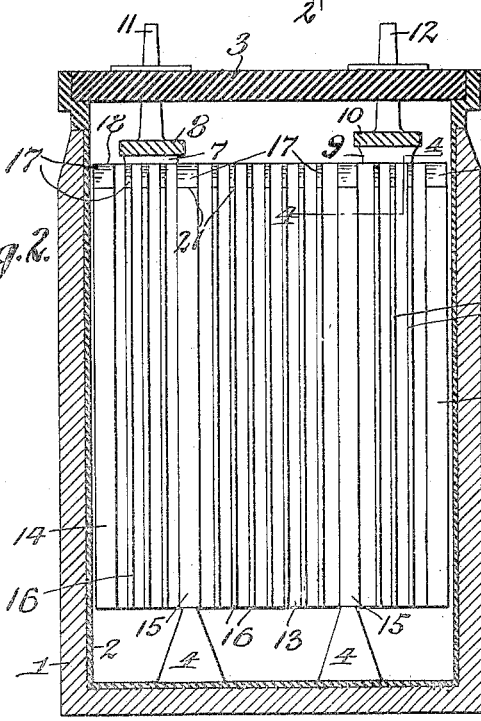
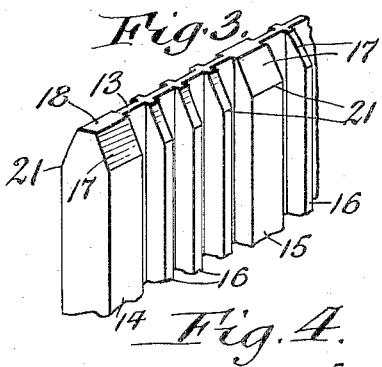
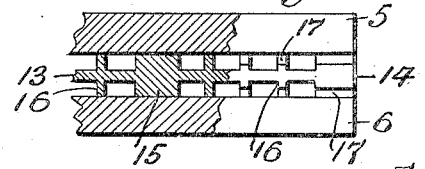
Inventor
Rufus N. Chamberlain
by Geyer & Popp
Attorneys

UNITED STATES PATENT OFFICE.

RUFUS N. CHAMBERLAIN, OF CHICAGO, ILLINOIS, ASSIGNOR TO GOULD STORAGE BATTERY CO., OF DEPEW, NEW YORK, A CORPORATION OF NEW YORK.

SEPARATOR FOR STORAGE BATTERIES.

1,343,708.     Specification of Letters Patent.     Patented June 15, 1920.

Application filed October 21, 1918. Serial No. 259,011.

*To all whom it may concern:*

Be it known that I, RUFUS N. CHAMBERLAIN, a citizen of the United States, residing in Chicago, in the county of Cook and State of Illinois, have invented new and useful Improvements in Separators for Storage Batteries, of which the following is a specification.

This invention relates to a separator for storage batteries and more particularly to a separator which is constructed of wood. As is well known wood affords a better and safer separation between the battery plates and the same is also much cheaper than other materials which have been used for this purpose, such as rubber and glass.

The item of cost of these separators is particularly important in the case of batteries which are used for lighting railway cars inasmuch as such batteries require comparatively thick separators owing to the distance between the positive and negative plates of the battery.

In many types of batteries heretofore in use, particularly those designed for railway lighting purposes, wood separators were employed between the positive and negative plates which were provided with comparatively heavy, thick vertical end portions or sections to insure the safe operation and insulation of the same and also heavy intermediate upright portions or sections resting on the usual bridges which support the plates and the separators. These separators have heretofore usually been so constructed that their upper ends presented a horizontal surface which extended across the entire width of the separator thereby forming comparatively sharp corners between the vertical sides and the horizontal top edge of each separator and also producing a shelf or lodging surface on the upper end of the separator which is of unduly large area.

In order to place these separators between the several battery plates it has been customary to spread these plates in the form of a fan so as to facilitate the introduction of the separators between the plates. Notwithstanding that this spreading out into fan shape of the plates permitted of more easy introduction of the separators between the plates, it nevertheless requires considerable endwise pressure on the separators when pushing the same in order to get them between the plates which frequently resulted in splitting, cracking or straining of the web portion or body of the separator by reason of the resistance encountered when the upper blunt end of the separator engaged with the opposing sides of adjacent plates. When the plates are thus widely spread apart preparatory to receiving the separators between them, the security of the connection between the cross straps and the plates was endangered by reason of the liability of breaking the necks or lugs between these plates and the straps when they are bent during the operation of spreading the plates. Another disadvantage in this prior construction is that the sharp corners at the upper ends of the separators tend to cut, scrape or shave off some of the active material on the plates when the separators are pushed upwardly between the same and thereby impair the efficiency of the battery accordingly. Moreover the larger area presented at the upper ends of the prior separators afford shelves of considerable capacity upon which can lodge such an amount of active material which is thrown off from the plates while in operation or the material which is shaved off from the plates when pushing the separators into place between the same as would be liable to cause short circuits between the plates and thus shorten the life of the battery.

The object of this invention is the production of a separator of this character in which the above mentioned objections are obviated and the same consists generally in so constructing each separator that its upper end tapers toward the top edge thereof, thereby enabling the same to be pushed easily between the battery plates by reason of the wedge action of the same, which also obviates the necessity of widely separating the battery plates and avoids straining of the necks which connect the same with the straps. Furthermore this tapering formation of the upper ends of the separators removes the cutting edge at the top of the separators so that the liability of scraping off some of the active material from the plates is avoided and also permits the introduction of the separators between the plates to be effected by means of a light pressure and without causing any strains which are liable to crack or split the thin web portion of the separator. Another advantage due to the tapering form of the upper edge of the separator is that it removes the broad shelf at the top of the same and thus prevents dangerous lodgment of active material thereon and eliminates the tendency of short circuiting of the battery plates.

In the accompanying drawings:

Figure 1 is a vertical longitudinal section of a storage battery provided with one form of separators constructed in accordance with my invention. Fig. 2 is a vertical transverse section of the same taken on line 2—2, Fig. 1. Fig. 3 is a fragmentary perspective view of one form of separator containing my improvements. Fig. 4 is a fragmentary horizontal section, on an enlarged scale, taken on line 4—4, Fig. 2. Figs. 5 and 6 are fragmentary sectional elevations showing modified forms of separators which are made in accordance with my invention.

Similar characters of reference refer to like parts throughout the several views.

Although the tank of the battery may be variously constructed that shown in the drawings, by way of example, comprises a wooden body 1 having an internal lining 2 of lead and a cover 3 of suitable insulating material. On the bottom of this tank is arranged a support for the plates and separators which in this instance consists of two bridges 4 of porcelain.

5, 6 represent the positive and negative plates of the battery which are arranged transversely in a longitudinal row within the tank and alternate with each other, the positive plates being provided at their upper ends with upwardly projecting necks 7 whereby the same are connected with a longitudinal strap 8 extending over the several plates, and the negative plates being provided with similar upwardly extending necks 9 whereby the same are connected with a longitudinal strap 10 also arranged above the several plates. These two straps are provided with the usual terminals 11, 12 which project upwardly through the top of the tank for connecting the same with the parts with which they are to be used.

Between each pair of battery plates is arranged a separator which embodies my invention. This separator is constructed of wood, preferably cypress, so as to form a thin upright web or body 13 and a plurality of upright ribs 14, 15, 16 which are arranged on opposite sides of the web. The ribs 14 adjacent to the upright vertical edges of the web are made comparatively wide so as to provide a firm support between the vertical edge portions of the battery plates, and the inner ribs 15 above the bridges 4 are also made comparatively wide so that the separator is heavier or thicker at these places and is thereby firmly and reliably supported. The ribs 16 arranged on the web between the inner wide ribs 15 and the outer wide ribs 14 are made comparatively narrow so as not to interfere with the operation of the electrolyte on the active material of the plates and still space the latter apart properly.

At their upper ends the ribs on opposite sides of the web are beveled or inclined as shown at 17, so that the separator as a whole is of upwardly tapering form at its upper end. A separator having this upper wedge shaped form at its upper end can be pushed easily and with light pressure between adjacent battery plates without requiring the latter to be spread apart to facilitate this purpose, thereby avoiding bending and possible breaking of the necks which connect these plates with the cross straps as well as avoiding the danger of splitting or cracking the web of the separator as would be liable to occur if an undue pressure were necessarily exerted against the same for inserting it between a pair of adjacent battery plates. Owing to the absence of sharp corners which are eliminated in the present case by the upwardly tapering part of the separator, no scraping, cutting or shaving effect is produced on the opposing surfaces of the plates as would otherwise be liable to occur, thereby leaving these plates intact and maintaining the same in a condition of maximum efficiency as well as prolonging the life of the same. Furthermore the upward tapering form of the upper ends of this separator avoids the possibility of lodgment thereon of active material which is thrown off from the plates while in operation and thus avoids the danger of short circuiting of the battery.

As shown in Figs. 1 and 3 the upper ends of the ribs of the separators are so constructed that only a slight blunt surface 18 of inconsiderable area is left at the upper end of the separator which is practically not objectionable and does not offer an opportunity for the lodgment of active material to such an extent as would tend to short circuit the plates. If desired the tapering upper ends of the plates may terminate either in a rounded upper edge 19, as shown in Fig. 5 or the same may terminate in a sharp edge 20, as shown in Fig. 6, but it is preferable to construct this edge in the form of a very narrow flat horizontal face which is perpendicular to the sides of the separator, inasmuch as this form can be produced at less cost, the separator is maintained at its maximum strength and its upper edge is not liable to be injured while being handled during assembling of the battery parts.

In the construction shown in Figs. 1, 2 and 3, the corner or turn 21 at the outer vertical surfaces on the lower parts of the ribs and the upper beveled faces the same is abrupt or sudden but if desired this turn or corner may be made of rounded form, as shown at 22 in Fig. 5, thereby still further guarding against the possibility of cutting, scraping or shaving off any of the material from the plates while pushing the separators between the plates. The tendency of the abrupt corners 21 to scrape the plates is, however so inappreciable that this form is preferred on account of the smaller cost of producing the separation in this form.

I claim as my invention:

A separator for storage batteries having the form of an upright plate, the main lower portion of which has its opposite sides arranged substantially parallel and the upper portion of which tapers upwardly toward the upper edge of the plate.

RUFUS N. CHAMBERLAIN.